C. R. MARSHALL.
LAND HARROW.
APPLICATION FILED JUNE 24, 1914.
1,151,702.
Patented Aug. 31, 1915.
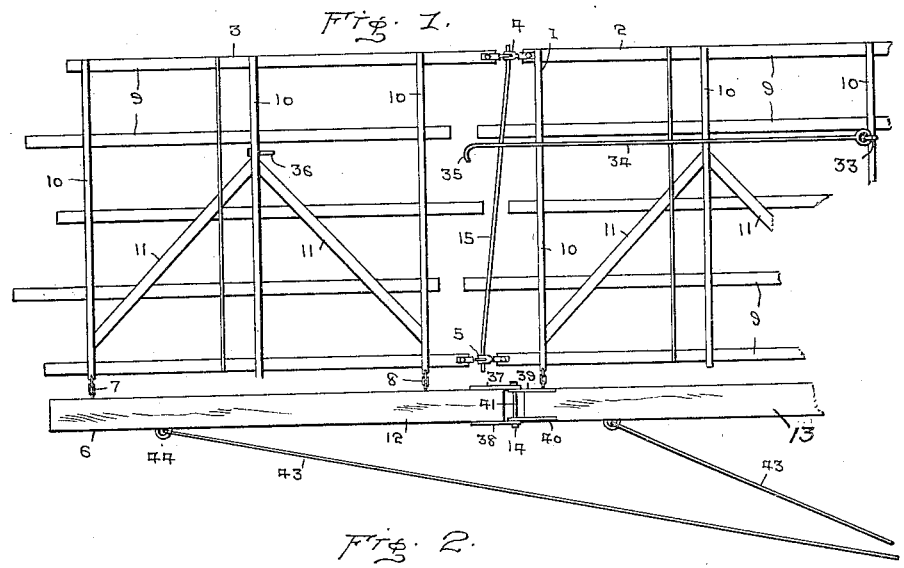
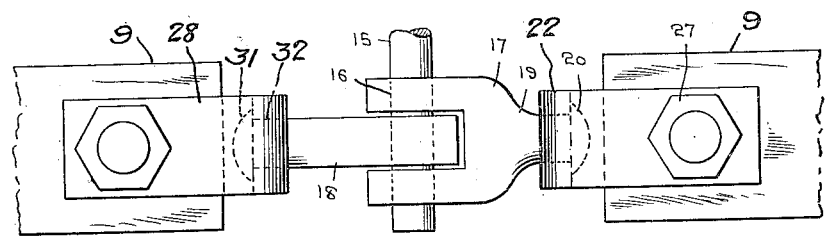
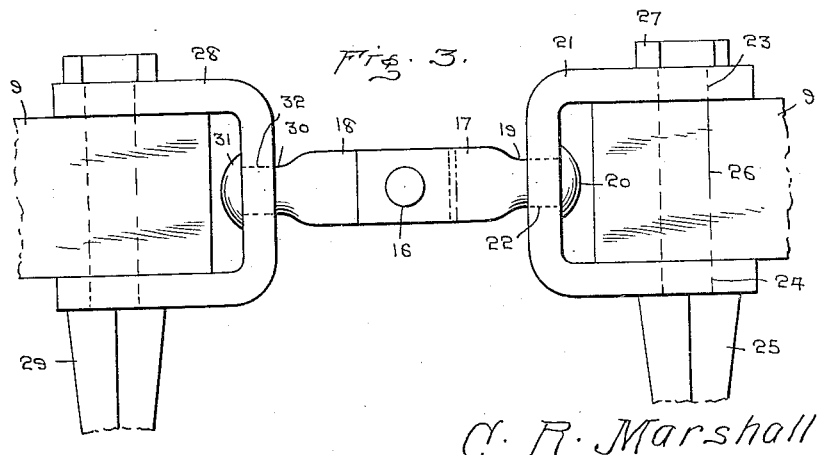
WITNESSES
C. R. Marshall
INVENTOR
Attorneys

UNITED STATES PATENT OFFICE.

CLYDE R. MARSHALL, OF CEDAR RAPIDS, IOWA.

LAND-HARROW.

1,151,702.     Specification of Letters Patent.     Patented Aug. 31, 1915.

Application filed June 24, 1914. Serial No. 846,949.

*To all whom it may concern:*

Be it known that I, CLYDE R. MARSHALL, a citizen of the United States, residing at Cedar Rapids, in the county of Linn and State of Iowa, have invented certain new and useful Improvements in Land-Harrows; and I do hereby declare the following to be a full, clear, and exact description of the invention, such as will enable others skilled in the art to which it appertains to make and use the same.

My invention relates to harrows and in particular to jointed sectional harrows.

The main object in my invention is to so hinge the sections of my harrow that said sections can be practically turned upward and yet allow the hinge to remain in its proper adjusted position out of the way of the harrow bars.

Another object in my invention is to hinge the draw bar in sections to correspond to the hinged sections of my harrow.

With these and other objects in view to be developed as I proceed I shall explain my invention in which a preferred embodiment is shown in the drawings, but I desire to state that I do not wish to be limited to the form of structure shown but claim all possible modifications within the scope of the claims appended hereto.

Similar characters of reference refer to similar parts in the drawings in which, Figure 1, is a top plan view showing the sections of the harrow hinged together. Fig. 2, is an enlarged detail top plan view of one of the hinged joints. And Fig. 3 is a side elevation of the hinged joint looking at right angles to that shown in Fig. 2.

Referring to Fig. 1 in the drawing 1 is the harrow consisting of a plurality of sections 2 and 3 hinged together at their fore and aft sections such as at 5 and 4, and are also connected to the draw bar 6 as to each section as shown at 7 and 8. Each section comprises the usual framework of cross bars 9 and lateral bars 10 braced into operative position by the brace bars 11 which are connected to the central lateral bar 10.

The draw bar 6 is of the usual construction and is composed of a plurality of sections 12 and 13, each section corresponding to one of the sections of the harrow and hinged together as at 14 in the same plane to that of the hinges connecting the harrow sections. Each hinge connecting the harrow sections is coupled in pairs by means of the spindle bar 15, said spindle bar connecting the fore and aft hinges between the same sections, said spindle bar running through suitable apertures 16, shown in Fig. 3 and indicated by dotted lines in Fig. 2, these apertures running through a yoke member 17 and a link member 18, the link member 18 extending in between the arms of the yoke member 17 for pivotal play. Owing to the fact that the fore and aft hinges are not in the same plane to each other the ends of the bar are so bent that they will pass through each hinge at a true right angle, as best shown in Fig. 1 of the drawings.

The yoke member 17 has a neck portion 19 which ends in a head 20, said neck being loosely mounted in an aperture 22 of a substantially U-shaped member 21, the head 20 holding the neck 19 in engagement with the member 21. The ends of the U-shaped member 21 extend above and below the end of one of the cross bars 9 and said ends are provided with registering apertures 23 and 24 to receive the shank portion 26 of a harrow tooth 25, said shank passing through an aperture in the cross bar 9 and having its upper end threaded to receive a nut 27, by means of which the member 21 is pivotally secured to the cross bar 9. A like yoke member 28 is connected to the cross bar 9 of the opposite section, and is bolted to said cross bar by a harrow tooth 29 in the same manner as is the yoke member 21, and the yoke member 29 carries the link 18, said link having a neck portion 30 and a head 31, the neck portion thereof extending through a suitable aperture 32 in the yoke member 28. Connected to the central lateral bar 10 of the central section 2, by means of an eyelet 33, is a rod 34 having a hook portion 35 at the end thereof, said hook portion being adapted to engage an eyelet 36 mounted upon the central lateral bar 10 of the end section 3 to lock the section in a substantially vertical position when said end section is raised and the hook 35 engaged with the eyelet 36. All the sections used in the harrow, and I do not mean to be limited by a special number, are mounted and hooked in this same manner.

The hinges 14 of the draw bar 6 are composed of the usual registering strap members 37 and 38 and corresponding strap members 39 and 40 and a swiveled or hinged pin 41 which allows of a pivotal action after being locked in assembled position for this purpose by any desired means. Running from each section of the cross bar 6 is a draw rod 43, said draw rod being connected to the sections of the draw bar by means of eyelet connections 44, and running to a central draw ring (not shown) as is the customary manner. The draw rods 43 are hinged intermediate their ends (not shown) so that said rods will play when the ends of my harrow are lifted. By constructing the harrow and draw bar in sections and hinging the sections together, as shown, the harrow can, when folded, be moved through a gate or other opening of less width than the width of the harrow when extended and by providing the form of hinging members shown, the simplicity, strength and durability of the device will not be detracted from.

Having described my invention what I claim as new and desire to secure by Letters Patent is:—

1. A harrow comprising a sectional draw bar, a harrow section connected to each section of the sectional draw bar and hinges connecting each harrow section to its neighbor, said hinges comprising yoke members, link members, said yoke and link members being connected to oppositely disposed substantially U-shaped members, said U-shaped members being connected to the harrow sections and a spindle bar connecting said link members and said yoke members in pivotal relation.

2. A harrow comprising harrow sections, hinges securing the sections together, said hinges consisting of a spindle rod having bent end portions, link portions mounted thereupon, yoke members mounted thereupon, and assembled with said link members and means to connect said hinges to adjoining harrow sections.

3. A harrow comprising hinged sections, the hinges being connected in pairs and consisting of a pair of oppositely disposed substantially U-shaped members having apertures therein, harrow teeth connecting said U-shaped members to each harrow section by means of said apertures, a yoke member pivoted in one U-shaped member said yoke having apertures therethrough, a link member pivoted in said opposite U-shaped member and having an aperture therethrough and a spindle bar having its ends extending through said apertures in a yoke and link and connecting said hinges in pairs.

4. A harrow comprising hinged sections and a spindle bar connecting the hinges of said sections in pairs, said spindle bar consisting of oppositely bent end sections adapted to connect a portion of said hinges into operative position.

5. A harrow comprising hinged sections, hinges connecting said sections, said hinges being mounted in pairs, said hinges consisting of oppositely disposed U-shaped members, harrow teeth connecting said U-shaped members to the harrow sections by means of a shank portion and nut clamping said U-shaped members to said harrow sections, a link member mounted in one of said U-shaped members and having an aperture at the opposite end thereof, a yoke member mounted in the opposite of said U-shaped members having registering apertures in each arm thereof and a spindle rod running through said apertures, said spindle rod having its ends bent to be inserted in said apertures and connecting said hinges in pairs.

In testimony whereof I have signed my name to this specification in the presence of two subscribing witnesses.

CLYDE R. MARSHALL.

Witnesses:
STUART F. LINDEMAN,
H. N. ROCKWOOD.